United States Patent Office 3,446,317
Patented May 27, 1969

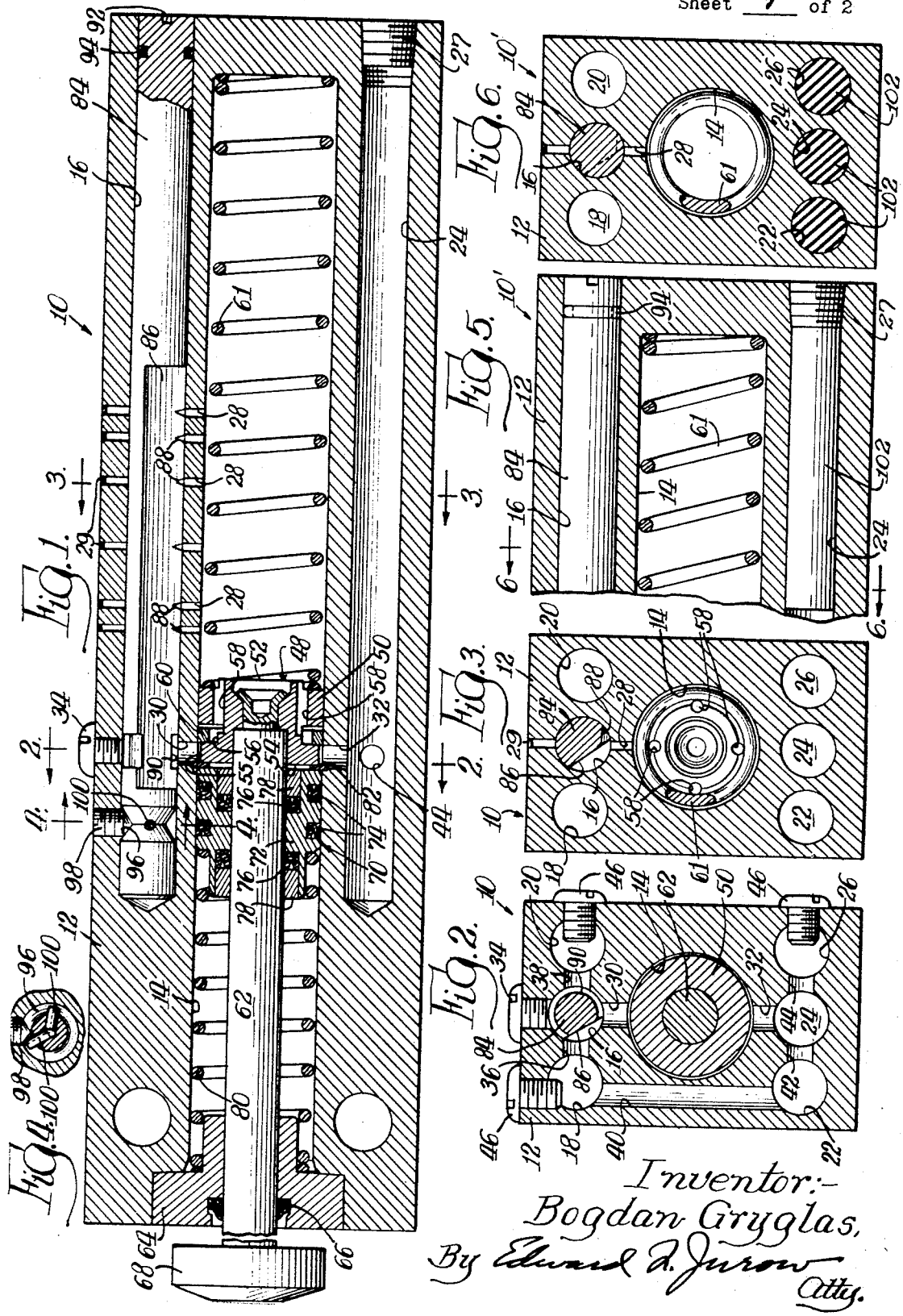

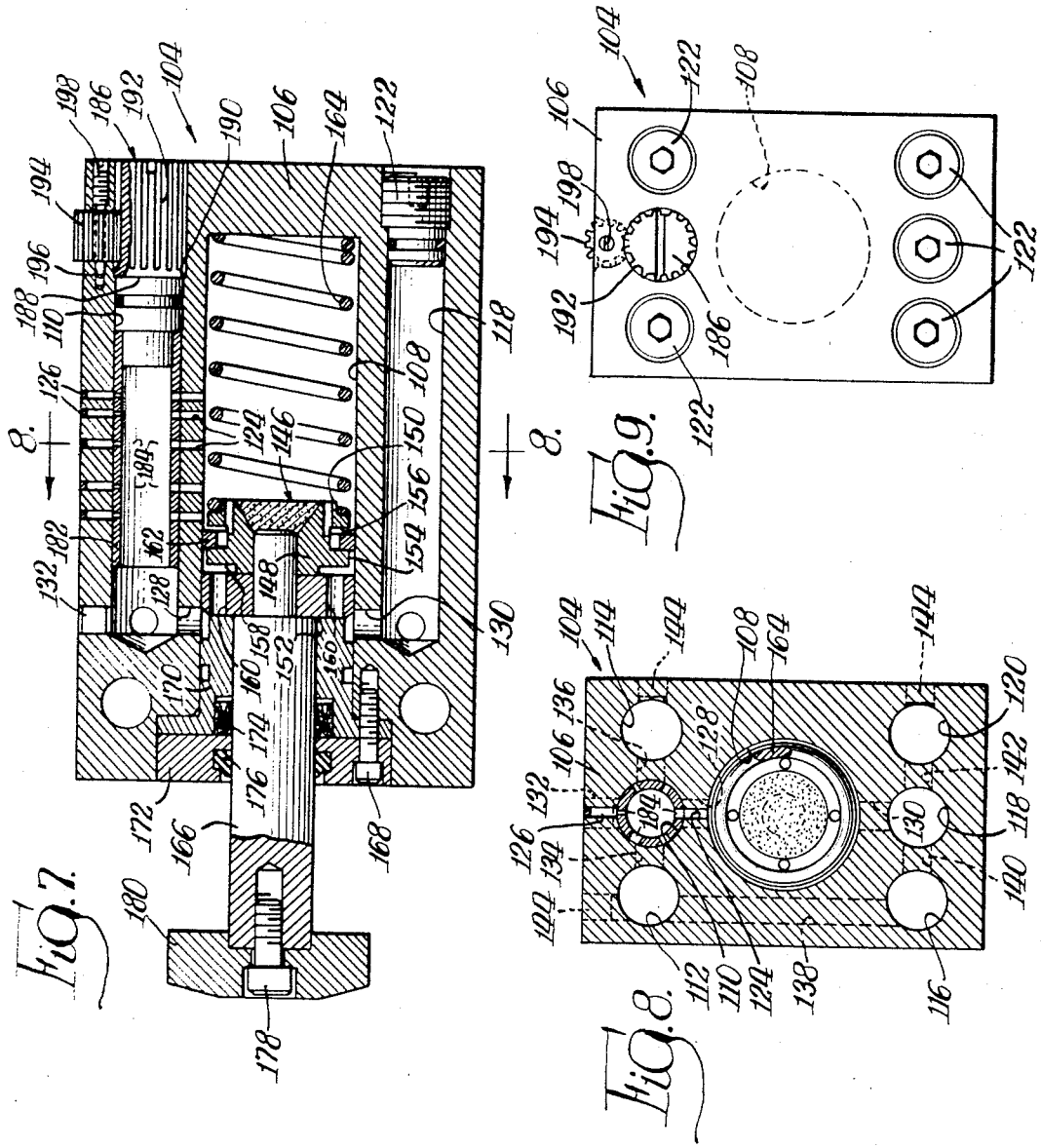

3,446,317
ADJUSTABLE SHOCK ABSORBER
Bogdan Gryglas, Chicago, Ill., assignor to Efdyn Corporation, Chicago, Ill., a corporation of Illinois
Filed Aug. 28, 1967, Ser. No. 663,728
Int. Cl. F16d 57/00; E05f 3/04, 3/10
U.S. Cl. 188—88                             8 Claims

ABSTRACT OF THE DISCLOSURE

A shock absorber having ports through which fluid is metered from a primary chamber upon application of an impact force to a piston slidable in the chamber, and an adjustable flow control member for regulating the flow of fluid through the ports.

BACKGROUND OF THE INVENTION

Field of the invention

The present invention pertains generally to a hydraulic shock absorber, which is adapted for use, for example, in aircraft, automotive, machine and railroad applications, and which is capable of being adjusted to decelerate loads of differing kinetic energy quantities.

Description of the prior art

The hydraulic shock absorber comprises a primary chamber filled with fluid and having slidably mounted therein a piston which is connected to a piston rod adapted to receive impact forces. Heretofore, certain shock absorbers have been provided with metering orifice means for the primary chamber through which fluid is forced when the shock absorber is under load, and orifice regulating means for the metering orifice means. However, such prior constructions have not been as efficient in operation, as readily adjustable and as economical to manufacture as might be desired. Moreover, many of these shock absorbers have been operable solely in a horizontal position.

SUMMARY OF THE INVENTION

The present invention is concerned with several embodiments of a shock absorber having a housing defining a primary chamber and a secondary chamber, a piston assembly axially movable within the primary chamber, a piston rod secured to the piston assembly and extending outwardly of the housing for receiving impact forces, at least one metering port between the primary chamber and the secondary chamber, and a flow control member within the secondary chamber and defining orifice means therein at the metering port. The flow control member is adjustable to vary the effective area of the orifice means whereby to regulate the flow of fluid outwardly of the primary chamber through the metering port as the piston assembly moves through the primary chamber under an impact force.

More specifically, a plurality of metering ports are provided between the primary and secondary chambers, the flow control member is formed with a plurality of orifices alignable with the metering ports, and the respective metering ports and orifices are spaced apart exponentially to provide a uniform rate of deceleration throughout the stroke of the piston. One embodiment of flow control member is in the form of a rod member which is provided with a lengthwise flat and chordal grooves to define orifices, and which is adapted to be rotated for easy and accurate adjustment of the effective areas of the orifices. Another embodiment of flow control member is in the form of a rotatable tubular member having a plurality of series of orifices of different diameters which are selectively alignable with the metering ports for presenting different effective orifice areas.

Additionally, the present invention contemplates providing the housing with a plurality of tertiary chambers which serve as fluid reservoirs, and, in one embodiment, providing the primary chamber with a floating gland assembly which serves as an accumulator. Moreover, for economy of manufacture, the housing is preferably formed from a solid elongated bar; the primary, secondary and tertiary chambers are defined by parallel bores formed in the elongated bar; and the necessary interconnecting passages are formed by conventional drilling operations. Finally, in a further embodiment of the present invention, a cellular member is disposed in at least one of the tertiary chambers to serve as an accumulator thereby permitting the shock absorber to be completely filled with hydraulic fluid and to be mounted in any position.

Brief description of the drawing

FIGURE 1 is a longitudinal median sectional view of a shock absorber incorporating the principles of the present invention;

FIGURE 2 is a transverse sectional view of the shock absorber of FIGURE 1, taken substantially along the line 2—2 in FIGURE 1, looking in the direction indicated by the arrows;

FIGURE 3 is a transverse sectional view of the shock absorber of FIGURE 1, taken substantially along the line 3—3 in FIGURE 1, looking in the direction indicated by the arrows;

FIGURE 4 is a fragmentary transverse sectional view of the shock absorber of FIGURE 1, taken substantially along the line 4—4 in FIGURE 1, looking in the direction indicated by the arrows;

FIGURE 5 is a partial longitudinal median sectional view of a modified embodiment of shock absorber incorporating the principles of the present invention;

FIGURE 6 is a transverse sectional view of the shock absorber of FIGURE 5, taken substantially along the line 6—6 in FIGURE 5, looking in the direction indicated by the arrows;

FIGURE 7 is a longitudinal median sectional view of another modified embodiment of shock absorber incorporating the principles of the present invention;

FIGURE 8 is a tranverse sectional view of the shock absorber of FIGURE 7, taken substantially along the line 8—8 in FIGURE 7, looking in the direction indicated by the arrows; and FIGURE 9 is an end elevational view of the shock absorber of FIGURE 7.

Description of the preferred embodiments

Referring now to FIGURES 1-3, there is indicated generally by the reference numeral 10 a hydraulic shock absorber incorporating the principles of the present invention. The shock absorber 10 includes a housing 12 which is fabricated from an elongated solid rectangular steel bar. The housing 12 is formed with a central bore 14 which defines a primary chamber, a parallel bore 16 which defines a secondary chamber, and a plurality of parallel bores 18, 20, 22, 24 and 26 which define tertiary chambers. The primary chamber 14 is bored from the forward end of the housing 12, while the secondary and tertiary chambers are bored from the rearward end of the housing 12. The outer ends of the tertiary chambers are closed by seal bolts 27, one of which is shown in FIGURE 1.

A plurality of axially spaced metering ports 28 are provided between the primary and secondary chambers 14 and 16. The ports 28 are formed by drilling holes downwardly through the top side of the housing 12; afterwards, the upper end portions of such drilled holes are closed by wires 29 secured in place as by welding. In accordance with the principles of the present invention, the ports 28 are of a uniform diameter and are spaced apart exponentially. A passageway 30 is provided between the primary and secondary chambers 14 and 16, and a longitudinally aligned passageway 32 is provided between the primary chamber 14 and the tertiary chamber 24. The passageways 30 and 32 are formed in one operation by drilling a hole downwardly through the top side of the housing 12, which hole is closed at its outer end by a seal screw 34. As shown in FIGURE 2, aligned passageways 36 and 38 are provided between the secondary chamber 16 and the adjacent tertiary chambers 18 and 20; a passageway 40 is provided between the tertiary chambers 18 and 22; and aligned passageways 42 and 44 are provided between the tertiary chamber 24 and the adjacent tertiary chambers 22 and 26. The foregoing passageways, which interconnect the secondary and tertiary chambers, define passageway means, and are formed by drilling holes from the top side or from the right side of the housing 12. The outer ends of the drilled holes are closed by seal screws 46. By fabricating the housing in the foregoing manner, substantial economy of manufacture is attained.

Mounted for axial movement within the primary chamber 14 is a piston assembly 48 which includes a piston 50 presenting a rearward side 52 and a forward side 54. The piston 50, at its outer periphery, is formed with an annular recess 55 and with an annular groove 56 which communicates with axial ports 58 opening at the rearward side 52. Arranged within the piston groove 56 is a floating piston ring 60 which is narrower than the width of the groove 56 for a purpose to be described hereinafter. The piston assembly 48 is spring biased forwardly by means of a coil spring 61 arranged between the blind end of the primary chamber 14 and the piston 50.

A piston rod 62, at its inner end, is secured in the piston 50, as by staking, and extends from the forward side 54 thereof outwardly of the housing 12 for receiving impact forces. Secured in the open end of the primary chamber 14 by means of cap screws (not shown) is a piston rod bearing 64 which serves to slidably guide the piston rod 62 and to close the primary chamber 14. Supported within the piston rod bearing 64 is a conventional annular piston rod wiper 66 which engages the outer periphery of the piston rod 62 and provides a fluid seal during axial sliding movement of the latter. The outer end of the piston rod 62 has secured thereon by means of a cap screw (not shown) a bumper cap 68 which serves to protect the end of the piston rod 62 from repeated blows that would otherwise tend to upset the end.

Also mounted within the primary chamber 14, on the forward side of the piston 50, is a floating gland assembly 70 which includes an annular gland member 72. The gland member 72 is provided with outer peripheral gland seals 74, and with inner peripheral rod seals 76 maintained in position by annular retainers 78. The gland assembly 70 is slidable relative to the piston rod 62, and is spring biased rearwardly by means of a coil spring 80 extending between the piston rod bearing 64 and the gland member 72. In addition, a snap ring 82 is secured in the primary chamber 14 to establish the normal rest position of the piston assembly 48 and the gland assembly 70.

Mounted within the secondary chamber 16 is an adjustable flow control or rod member 84 which is formed with a lengthwise flat 86, a plurality of triangular chordal grooves 88 which intersect the flat 86 at the respective locations of the metering ports 28, and an annular groove 90 aligned with the passageway 30. Additionally, the rod member 84 is provided, at its outer end, with a slot 92 and an adjacent seal ring 94, and adjacent its inner end with an annular groove 96. The rod member 84 is axially positioned by means of a set screw 98 which is engaged in the annular groove 96; and rotational movement of the rod member 84, as shown in FIGURES 1 and 4, is limited by pin members 100 which extend radially from the rod member 84 into the annular groove 96 and which are engageable with the inner end of the set screw 98. To make the shock absorber 10 operational, it is filled to the desired level with suitable hydraulic fluid.

In the operation of the hydraulic shock absorber of the present invention, impact forces received by the bumper cap 68 cause the piston rod 62 and piston assembly 48 to move rearwardly within the primary chamber 14. As rearward movement of the piston assembly 48 commences, pressure initially built up in the hydraulic fluid within the rearward portion of the primary chamber 14 causes the floating piston ring 60 to be forced into abutment with the forward side of the annular groove 56 thereby preventing hydraulic fluid from flowing past the piston 50. During rearward movement of the piston assembly 48, the hydraulic fluid is forced outwardly of the primary chamber 14 through the restrictive metering ports 28 and the triangular chordal grooves 88 which define orifices, and then along the flat 86 of the rod member 84. By metering the displacement of hydraulic fluid from the primary chamber 14 in the manner described, high energy absorption or dissipation characteristics are attained. Fluid flowing along the flat 86 is transmitted around the groove 90 and through the passageway 30 to the primary chamber 14 on the forward side of the piston assembly 48, and the floating gland assembly 70 in accordance with the degree of pressure of the fluid is caused to move forwardly against the bias of spring 80. The gland assembly 70 serves as an accumulator to accommodate the flow of fluid into the annular area surrounding the piston rod 62 intermediate of the piston assembly 48 and the gland assembly 70, maintains the fluid at operating level, and permits the shock absorber to be mounted at any attitude. Additionally, the fluid flows through the interconnecting passages to the tertiary chambers which serve as fluid reservoirs.

As the piston assembly 48 moves past and closes off successive metering ports 28, there is a reduction in the number of ports and the associated orifices 88, and hence in the total effective area of the orifices, through which hydraulic fluid can be displaced from the primary chamber 14. At the beginning of the stroke of the piston rod 62, the total effective area of the orifices available for fluid displacement is at a maximum, while at the end of the stroke, when the piston assembly 48 has moved past all of the ports, the total effective area of the orifices available for fluid displacement is zero. Because the ports 28 are of a uniform diameter and are spaced apart exponentially, and because the orifices 88 are of uniform size and configuration and are correspondingly oriented axially, the total effective orifice area decreases exponentially with the stroke of the piston. Therefore, the shock absorber provides a uniform stopping force as well as a uniform rate of deceleration throughout the stroke.

When the impact force is removed from the bumper cap 68, the springs 61 and 80 serve to return the piston assembly 48 and the floating gland assembly 70 to the normal rest position shown in FIGURE 1. During such forward return motion of the piston assembly 48, the floating piston ring 60 abuts the rearward side of the annular groove 56 thereby permitting the free flow of hydraulic fluid past the piston 50 through the annular recess 55, the annular groove 56 and the ports 58. At the same time, hydraulic fluid in the primary chamber 14 on the forward side of the piston assembly 48 is permitted to flow outwardly thereof through the passageway 30.

When a load with a different kinetic energy is to be absorbed, a suitable implement, such as a screw driver, may be inserted in the slot 92 at the end of the rod member 84 and used to rotate the latter. Within the range permitted by the pin members 100, the rod member 84 may be turned clockwise, as viewed in FIGURES 2 and 3, to decrease the effective orifice area provided by the triangular chordal grooves 88. Correspondingly, the rod member 84 may be turned counterclockwise back toward the position shown in FIGURES 2 and 3 to increase the effective orifice area of the triangular chordal grooves 88. During adjustment of the rod member 84, the size of each orifice is changed uniformly. Therefore, in all normal operating positions of the rod member 84, the total effective orifice area will always decrease exponentially with the stroke of the piston assembly 48. As will be appreciated, the shock absorber 10 may be easily and accurately adjusted, and hence is highly efficient in operation.

The modified embodiment of shock absorber 10' shown in FIGURES 5 and 6 is identical in all respects to the shock absorber 10 except that elongated cellular members 102 are disposed in the lower tertiary chambers 22, 24 and 26. The cellular members 102, which preferably embody closed nitrogen filled cells and serve as accumulators, permit the shock absorber 10' to be completely filled with hydraulic fluid and to be mounted in any position—even upside down. To obtain different rates of accumulation, cellular members with different compressibility characteristics may be used, the length of the cellular members may be changed, or the number of cellular members may be changed.

Referring now to FIGURES 7–9, there is indicated generally by the reference numeral 104 another embodiment of hydraulic shock absorber incorporating the principles of the present invention. The shock absorber 104 includes a housing 106 which is fabricated from an elongated solid rectangular steel bar. The housing 106 is formed with a central bore 108 which defines a primary chamber, a parallel bore 110 which defines a secondary chamber, and a plurality of parallel bores 112, 114, 116, 118 and 120 which define tertiary chambers. The primary chamber 108 is bored from the forward end of the housing 106, while the secondary and tertiary chambers are bored from the rearward end of the housing 106. The outer ends of the tertiary chambers are closed by seal plugs 122.

A plurality of axially spaced metering ports 124 are provided between the primary and secondary chambers 108 and 110. The ports 124 are formed by drilling holes downwardly through the top side of the housing 106; afterwards, the upper end portions of such drilled holes are closed by wires 126 secured in place as by welding. The ports 124 are of a uniform diameter and are spaced apart exponentially. A passageway 128 is provided between the primary and secondary chambers 108 and 110, and a longitudinally aligned passageway 130 is provided between the primary chamber 108 and the tertiary chamber 118. The passageways 128 and 130 are formed in one operation by drilling a hole downwardly through the top side of the housing 106, which hole is closed at its outer end by a seal plug 132. As shown in FIGURE 8, aligned passageways 134 and 136 are provided between the secondary chamber 110 and the adjacent tertiary chambers 112 and 114; a passageway 138 is provided between the tertiary chambers 112 and 116; and aligned passageways 140 and 142 are provided between the tertiary chamber 118 and the adjacent tertiary chambers 116 and 120. The foregoing passageways, which interconnect the secondary and tertiary chambers, define passageway means, and are formed by drilling holes from the top side or from the right side of the housing 106. The outer ends of the drill holes are closed by seal plugs 144.

Mounted for axial movement within the primary chamber 108 is a piston assembly 146 which includes a piston 148 presenting a rearward side 150 and a forward side 152. The piston 148, at its outer periphery, is formed with an annular recess 154, an annular groove 156, and an annular groove 158 which communicates with axial ports 160 opening at the forward side 152. Arranged within the piston groove 156 is a floating piston ring 162 which is narrower than the width of the groove 156 for a purpose to be described hereinafter. The piston assembly 146 is spring biased forwardly by means of a coil spring 164 arranged between the blind end of the primary chamber 108 and the piston 148.

A piston rod 166, at its inner end, is secured in the piston 148, as by staking, and extends from the forward side 152 thereof outwardly of the housing 106 for receiving impact forces. Secured in the open end of the primary chamber 108 by means of cap screws 168 are a piston rod bearing 170 and a retaining ring 172 which serve to slidably guide the piston rod 166 and to close the primary chamber 108. Supported within the piston rod bearing 170 and the retaining ring 172, respectively, are an annular piston rod seal 174 and a piston rod wiper 176 which engage the outer periphery of the piston rod 166 and provide a fluid seal during axial sliding movement of the latter. The outer end of the piston rod 166 has secured thereon by means of a cap screw 178 a bumper cap 180 which serves to protect the end of piston rod 166 from repeated blows that would otherwise tend to upset the end.

Mounted within the secondary chamber 110 is an adjustable flow control or tubular member 182 which is formed with a plurality of axially spaced corresponding series of circumferentially spaced orifices 184. The orifice 184 in each circumferential series are of different diameters, the longitudinally corresponding orifices 184 of the several series are of uniform size, and each series of orifices 184 is arranged in the plane of one of the metering ports 124 to define orifice means. Additionally, the tubular member 182 has an outer enlarged end portion 186 which defines an annular radial shoulder 188 that bears against an annular radial shoulder 190 formed in the secondary chamber 110 for axially locating the tubular member 182. The enlarged end portion 186 of the tubular member 182 is also formed with gear teeth 192 which have meshing engagement with a manually operated pinion 194 rotatably mounted by means of a pin member 196 in the housing 106. Rotation of the pinion 194 serves to effect rotation of the tubular member 182 whereby to permit alignment of one orifice 184 of each circumferential series with the respective metering ports 124. A set screw 198 is provided for securing the pinion 194 in any preselected position. For operational purposes, the shock absorber 104 is filled to the desired level with suitable hydraulic fluid.

In the operation of the hydraulic shock absorber 104, impact forces received by the bumper cap 180 cause the piston rod 166 and piston assembly 146 to move rearwardly within the primary chamber 108. As rearward movement of the piston assembly 146 commences, pressure initially built up in the hydraulic fluid within the rearward portion of the primary chamber 108 causes the floating piston ring 162 to be forced into abutment with the forward side of the annular groove 156 thereby preventing hydraulic fluid from flowing past the piston 148. During rearward movement of the piston assembly 146, the hydraulic fluid is forced outwardly of the primary chamber 108 through the restrictive metering ports 124 and the aligned orifices 184, and then through the center of the tubular member 182. By metering the displacement of hydraulic fluid from the primary chamber 108 in the manner described, high energy absorption or dissipation characteristics are attained. Fluid flowing through the tubular member 182 is transmitted to the forward end of the secondary chamber 110 and through the passageway 128 to the primary chamber 108 on the forward side of the piston assembly 146. Additionally, the fluid flows through the interconnecting passages to the tertiary chambers which serve as fluid reservoirs.

As the piston assembly 146 moves past and closes off successive metering ports 124, there is a reduction in the number of ports and the associated orifices 184, and hence in the total effective area of the orifices, through which hydraulic fluid can be displaced from the primary chamber 108. At the beginning of the stroke of the piston rod 166, the total effective area of the orifices available for fluid displacement is at a maximum, while at the end of the stroke, when the piston assembly 146 is moved past all of the ports, the total effective area of the orifices available for fluid displacement is zero. Because the ports 124 are of a uniform diameter and are spaced apart exponentially, and because the orifices 184 aligned with the ports 124 are of uniform size, the total effective orifice area decreases exponentially with the stroke of the piston. Therefore, the shock absorber provides a uniform stopping force as well as a uniform rate of deceleration throughout the stroke.

When the impact force is removed from the bumper cap 180, the spring 164 serves to return the piston assembly 146 to the normal rest position shown in FIGURE 7. During such forward return motion of the piston assembly 146, the floating piston ring 162 moves away from the forward side of the annular groove 156 thereby permitting the free flow of hydraulic fluid through the piston assembly 146. At the same time, hydraulic fluid in the primary chamber 108 on the forward side of the piston assembly 146 is permitted to flow outwardly thereof through the passageway 128.

When a load with a different kinetic energy is to be absorbed, the set screw 198 is loosened with a suitable implement, such as a screw driver, and the pinion 194 is then manually rotated for effecting rotation of the tubular member 182 whereby corresponding orifices 184 of a different size may be respectively aligned with the metering ports 124. In this manner, the effective area of the orifice means may be easily and accurately adjusted. Because the corresponding orifices 184 of the several series are of uniform size, changes in effective orifice area at each metering port 124 are effected uniformly. Therefore, in all normal operating positions of the tubular member 182, the total effective orifice area will always decrease exponentially with the stroke of the piston assembly 146.

While there has been shown and described what are believed to be preferred embodiments of the present invention, it will be understood by those skilled in the art that various rearrangements and modifications may be made therein without departing from the spirit and scope of the invention.

I claim:
1. A shock absorber comprising a housing characterized by a series of elongated bores disposed parallel to one another, said bores defining, respectively, a primary chamber, a secondary chamber, and at least one tertiary chamber adapted to serve as a fluid reservoir, a piston assembly axially movable within said primary chamber and presenting forward and rearward sides, a piston rod connected to said piston assembly and extending from the forward side thereof outwardly of said housing for receiving impact forces, a plurality of axially spaced metering ports between said primary chamber and said secondary chamber on the rearward side of said piston assembly when the latter is in a normal rest position, a rod member rotatably mounted in said secondary chamber for controlling the fluid flow through said metering ports, said rod member being provided with a longitudinally extending flat and having a plurality of chordal grooves intersecting said flat with each groove being aligned with one of said metering ports, means for rotating said rod member to adjustably vary the effective orifice area of said grooves whereby to regulate the flow of fluid outwardly of said primary chamber through said metering ports as said piston assembly moves rearwardly in said primary chamber, and passageway means interconnecting said secondary chamber with both said tertiary chamber and said primary chamber on the forward side of said piston assembly.

2. The shock absorber of claim 1 wherein said housing comprises an elongated solid bar with said primary, secondary, and tertiary chambers and said passageway means being defined by bores drilled therein and with the open ends of said bores being closed by seal fasteners.

3. The shock absorber of claim 1 wherein said metering ports are of a uniform diameter and are spaced apart exponentially, and said chordal grooves are of uniform size and configuration and are correspondingly oriented axially.

4. The shock absorber of claim 1 including a cellular member disposed in at least one of said tertiary chambers and serving as an accumulator.

5. The shock absorber of claim 1 including a spring biased floating gland assembly in said primary chamber on the forward side of said piston assembly, and said gland assembly serving as an accumulator to accommodate the flow of fluid transmitted through said passageway means to said primary chamber on the forward side of said piston assembly.

6. A shock absorber comprising a housing defined by an elongated solid bar having at least two longitudinally disposed bores drilled therein in parallel relationship to one another with the outer ends of said bores being closed by seal fasteners, said bores defining, respectively, a primary chamber and a secondary chamber, a piston assembly axially movable within said primary chamber and presenting forward and rearward sides, a piston rod connected to said piston assembly and extending from the forward side thereof outwardly of said housing for receiving impact forces, a plurality of axially spaced metering ports between said primary chamber and said secondary chamber on the rearward side of said piston assembly when the latter is in a normal rest position, a rod member rotatably mounted in said secondary chamber for controlling the fluid flow through said metering ports, said rod member being provided with a longitudinally extending flat and having a plurality of chordal grooves intersecting said flat with each groove being aligned with one of said metering ports, means for rotating said rod member to adjustably vary the effective orifice area of said grooves whereby to regulate the flow of fluid outwardly of said primary chamber through said metering ports as said piston assembly moves rearwardly in said primary chamber, and passageway means interconnecting said secondary chamber with said primary chamber on the forward side of said piston assembly.

7. The shock absorber of claim 6 wherein said metering ports are of a uniform diameter and are spaced apart exponentially, and said chordal grooves are of uniform size and configuration and are correspondingly oriented axially.

8. The shock absorber of claim 6 including a spring biased floating gland assembly in said primary chamber on the forward side of said piston assembly, and said gland assembly serving as an accumulator to accommodate the flow of fluid transmitted through said passageway means to said primary chamber on the forward side of said piston assembly.

References Cited

UNITED STATES PATENTS

| 577,721 | 2/1897 | Collins | 188—97 X |
| 825,992 | 7/1906 | Welfley | 188—96 X |
| 2,130,939 | 9/1938 | Williams | 188—96 X |
| 2,443,896 | 6/1948 | Denburger | 16—51 |
| 2,867,298 | 1/1959 | Roder. | |
| 3,207,270 | 9/1965 | Ellis | 188—96 X |
| 3,344,894 | 10/1967 | Kenworthy | 188—96 |

FOREIGN PATENTS

| 242,989 | 4/1926 | Great Britain. |
| 284,062 | 1/1928 | Great Britain. |

GEORGE E. A. HALVOSA, Primary Examiner.

U.S. Cl. X.R.

16—51, 52; 188—96, 97; 213—43